United States Patent [19]
Lott

[11] 3,745,579
[45] July 10, 1973

[54] DOUBLE MIXING DOPPLER SIMULATOR
[75] Inventor: Lauren R. Lott, Riverside, Calif.
[73] Assignee: The United States of America as represented by the Secretary of the Navy, Washington, D.C.
[22] Filed: Feb. 26, 1969
[21] Appl. No.: 803,527

[52] U.S. Cl. .................................. 343/17.7, 35/10.4
[51] Int. Cl. ............................................... G01s 7/40
[58] Field of Search .................................... 343/17.7

[56] References Cited
UNITED STATES PATENTS
2,935,701   5/1960   Robinson et al. ............... 343/17.7 X
3,365,719   1/1968   Williams ........................... 343/17.7

Primary Examiner—T. H. Tubbesing
Attorney—E. J. Brower, J. M. St. Amand and T. M. Phillips

[57] ABSTRACT

A double mixing doppler simulator comprising a first balanced mixer, a first continuous wave source connected to the first balanced mixer, a first bandpass filter, also connected to the first balanced mixer, and a second balanced mixer connected to the first band-pass filter. The doppler simulator further comprises a second continuous wave source and a second band-pass filter connected to the second balanced mixer.

4 Claims, 5 Drawing Figures

LAUREN R. LOTT
INVENTOR.

LAUREN R. LOTT
INVENTOR.

BY J. M. St. Amand

ATTORNEYS

DOUBLE MIXING DOPPLER SIMULATOR

The invention herein described may be manufactured and used by or for the Government of the United States of America for governmental purposes without the payment of any royalties thereon or therefor.

BACKGROUND OF THE INVENTION

1. Field of the Invention

The present invention relates to a doppler shift simulating device. More particularly, it relates to a double-mixing doppler simulator for use in the design and testing of target detecting devices (TDD).

2. Description of the Prior Art

Various doppler simulation techniques have been known to the prior art such as the ones utilizing a mechanical doppler wheel, sine-wave drive on a ferrite phase modulator, or a traveling-wave tube serrodyne. All of these prior art techniques, however, are characterized by certain disadvantages. The mechanical doppler wheel has mechanical limitations such as noise and wear; it is unable to generate doppler frequencies greater than 10 KC. The sine-wave drive on a ferrite phase modulator technique is a compromise scheme that generates spurious sidebands which can result in inaccurate indications thus requiring compensating measures. The traveling-wave tube serrodyne is capable of high performance but is expensive and complex. Further, it requires frequent calibration.

The double-mixing doppler simulator of the present invention eliminates the use of costly traveling wave tubes and associated power supplies while yielding equally as true a doppler simulation.

BRIEF SUMMARY OF THE INVENTION

The double-mixing doppler simulator of the present invention comprises a first continuous wave source connected to a first balanced mixer, a first band-pass filter also connected to said first balanced mixer and a second balanced mixer connected to said first band-pass filter. The doppler simulator further comprises a second continuous wave source and a second band-pass filter connected to said second balanced mixer.

In operation the present system performs essentially two mixing and two filtering operations in sequence on a sample of the output from a TDD transmitter. The signals from the two continuous wave sources are both ultra-high frequency signals, chosen for ease of filter design. They differ in frequency by an amount equal to the desired doppler frequency so that the output signal is shifted in frequency relative to the input signal by this amount. The signal is then fed to the TDD receiver.

BRIEF DESCRIPTION OF THE DRAWINGS

Many of the attendant advantages of this invention will become readily appreciated as the same becomes better understood by reference to the following detailed description when considered in connection with the accompanying drawings wherein.

DESCRIPTION OF THE PREFERRED EMBODIMENT

Figure 1:
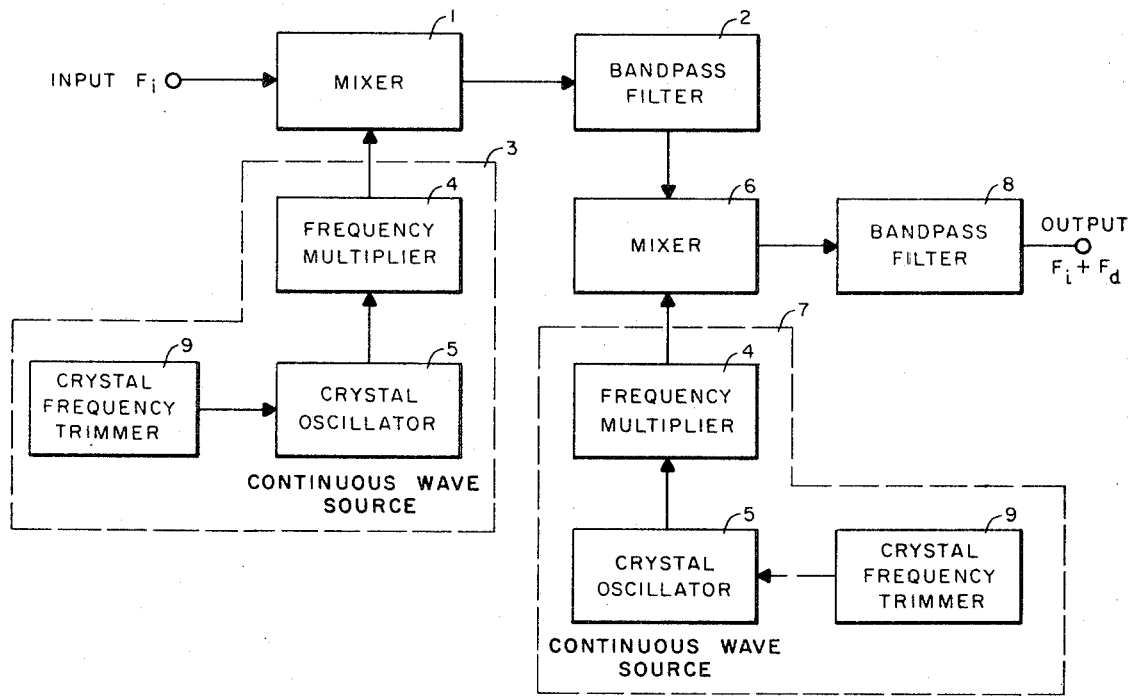
FIG. 1 is a block diagram showing an embodiment of the Double Mixing Doppler Simulator of the present invention.

Referring to FIG. 1, the doppler simulator of the present invention comprises a first balanced mixer 1, a first band-pass filter 2, a second balanced mixer 6, and a second band-pass filter 8. The doppler simulator further comprises means connected to said first balanced mixer 1 and to said second balanced mixer 2, for introducing a doppler frequency into the system. Again referring to FIG. 1, said means for introducing a doppler frequency shift into the system comprises a first continuous wave source 3 connected to said first balanced mixer 1, and a second continuous wave source 7 connected to said second balanced mixer 6. Each of the continuous wave sources comprises a crystal oscillator 5, a frequency multiplier 4 connected to the crystal oscillator 5, and a crystal frequency trimmer 9, which can be a manual adjustment, also connected to the crystal oscillator 5.

In the embodiment of FIG. 1, each of the continuous wave sources 3,7 has a frequency of approximately 400 Mc. By means of the adjustment of the crystal frequency trimmer 9, the frequency of the continuous wave sources 3,7 are displaced by a doppler frequency ranging from 10–100 Kc. The combination of said continuous wave sources 3,7 with the balanced mixers 1,6 and the band-pass filters 2,8, provides greater than 40 db suppression of unwanted mixing products.

In operation, the 400 Mc signal from the first continuous wave source 3 is mixed with the input signal $f_i$ in the first balanced mixer 1. The input signal $f_i$ is in the x-band and has a frequency variation of approximately $\pm$ 100 Mc. The output of the first balanced mixer 1 contains the microwave input signal $f_i$ with upper and lower 400 Mc sidebands added plus the original signal $f_i$ suppressed approximately 20 db. This signal is fed to the first band-pass filter 2 which is designed to pass only the lower side band ($f_i - 400$ Mc) with sufficient bandwidth to handle the frequency variation of approximately 100 Mc in the input signal $f_i$. This 400 Mc frequency plus an additional doppler frequency shift $f_d$ is added back into the microwave input signal $f_i$ in the second balanced mixer 6. Both balanced mixers 1,6 can be of the type V-8306B manufactured by Varian Corporation, Palo Alto, Calif. The second band-pass filter 8 passes the desired output frequency of $f_i + f_d$ and blocks all other frequencies.

The filters 2,8 used in the present embodiment are of straightforward design and consist of quarter-wave, coupled resonant-post waveguide sections. Such filters are described in "Design Relations for Resonant Post Waveguide Filters" by R. Wanselow, *Journal of the Franklin Institute*, February, 1961 and in "Direct-Coupled Waveguide Filters" by R. Sullivan, *DOFL Report TR-987*, March, 1962.

Figure 4A:
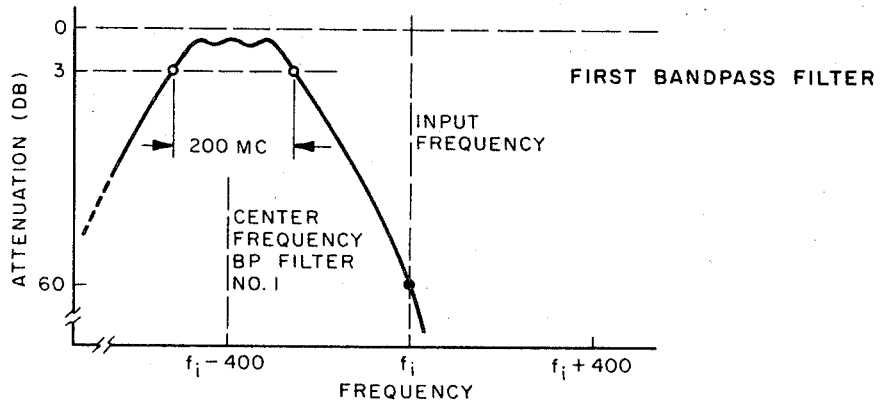
FIG. 4a is a plot showing the frequency characteristics of the first bandpass filter of FIG. 1.
Figure 4B:
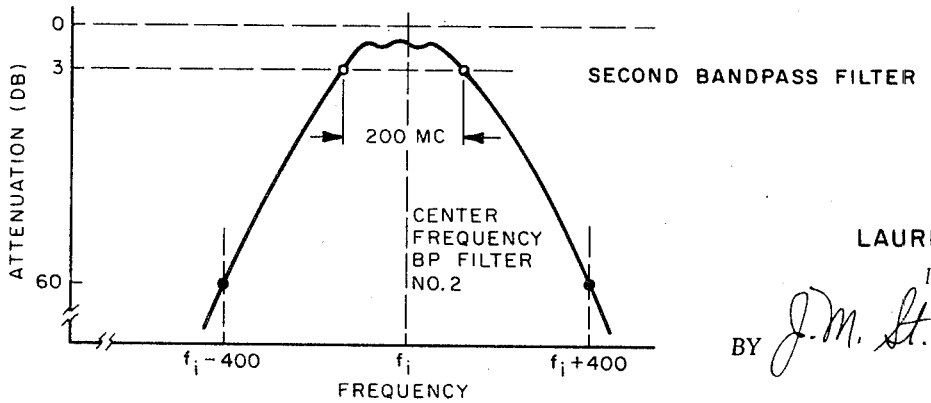
FIG. 4b is a plot showing the frequency characteristics of the second bandpass filter of FIG. 1.

Referring to FIG. 4a and Fig. 4b, the filters chosen are designed to accommodate the spread in input frequency and to give suitable skirt selectively and flatness of top. The offsetting frequency of approximately 400 Mc was selected as a convenience in filter rejection considerations and in the construction of the crystal oscillator 5 and frequency-multiplier 4.

Further, the order of taking the upper or lower sideband in the mixing-filter sequence is merely a matter of choice and the arrangement set forth in the above embodiment is merely typical.

Figure 2:
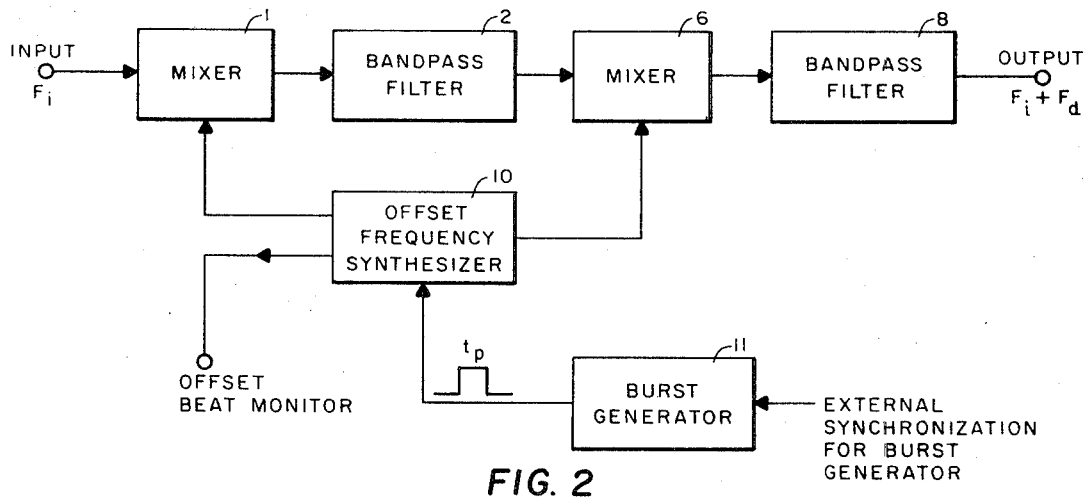
FIG. 2 is a block diagram showing another embodiment of the Double Mixing Doppler Simulator of the present invention.

Referring to FIG. 2, a second embodiment of the present invention is shown in which said first continuous wave source 3 and said second continuous wave source 7 are replaced by an offset frequency synthesizer 10 and a burst generator 11. The burst generator 11, which consists of a one-shot multivibrator with settable pulse, is connected to the offset frequency synthesizer 10 which is connected to both said first mixer 1 and said second mixer 6. Said synthesizer 10 generates the two UHF signals (approximately 400 Mc in the mode described, but not restricted to this frequency) used as local oscillators to feed the microwave balanced mixers 1,6 and to provide the frequency offsetting desired.

Figure 3:
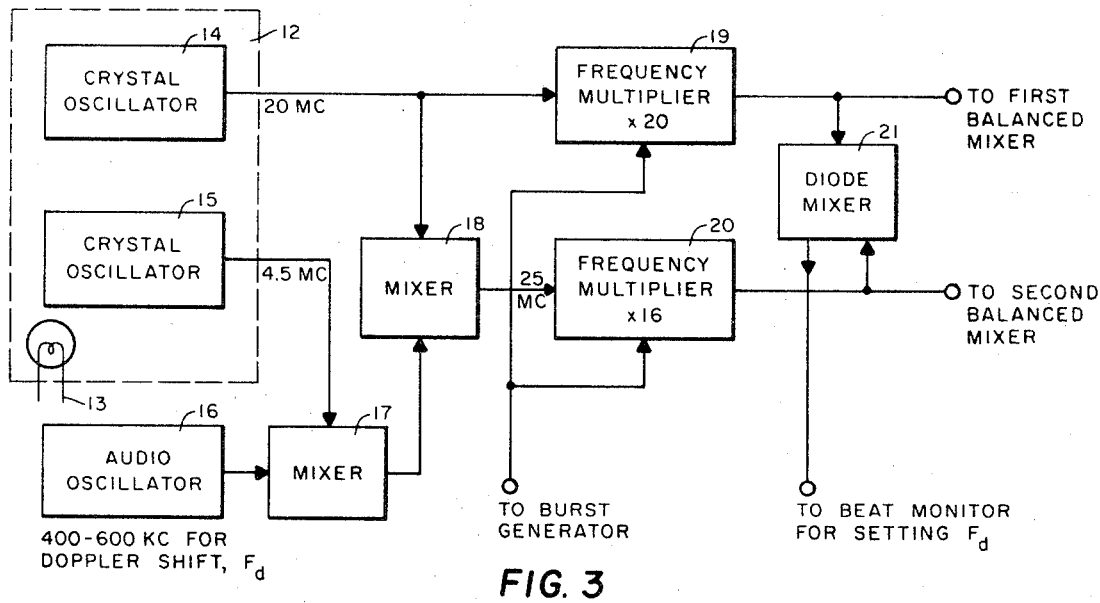
FIG. 3 is a block diagram showing the offset frequency synthesizer of the embodiment of FIG. 2.

Referring to FIG. 3, the offset frequency synthesizer 10 of FIG. 2 comprises two temperature stabilized crystal oscillators 14,15 coupled to a stable laboratory type audio oscillator 16 via mixers 17 and 18. Crystal oscillator 15 and audio oscillator 16 are connected directly to mixer 17 whose output is fed to mixer 18. Crystal oscillator 14 is connected directly to mixer 18 and also to a first frequency multiplier 19. In the present embodiment, the temperature of the crystal oscillators 14,15 is stabilized by enclosing them in a temperature stabilized box 12 containing a heating element 13. The crystal oscillators 14,15 are coupled, via mixers 17 and 18, as shown in FIG. 3, and the output of mixer 18 fed to a second frequency multiplier 20. A diode mixer 21 is connected between the outputs of said first and said second frequency multipliers 19,20.

The choice of the frequency of the crystal oscillators 14,15 and the respective multiplication factor of the corresponding frequency multipliers 19,20 is flexible. The values of the present embodiment were chosen with the intent of utilizing commonalty of frequency source and nearness in the value of the multiplication factor in order to minimize the effect of the frequency drift, attributable to the circuit components, on the stability of the doppler frequency offset. The use of the precision audio oscillator 16 provides means for accurately inducing the desired doppler frequency shift in the microwave signal. In addition, by beating the output of the two UHF local oscillator signals together in the simple diode mixer 21, a direct measure of the doppler shift can be obtained for monitoring.

What is claimed is:
1. A double mixing doppler simulator comprising:
   a. a first balanced mixer,
   b. a first band-pass filter connected to said first balanced mixer,
   c. a second balanced mixer connected in circuit with said first band-pass filter;
   d. a second band-pass filter connected to said second balanced mixer, and
   e. means for introducing a doppler frequency shift into the system coupled to said first and said second balanced mixers.

2. A double mixing doppler simulator as claimed in claim 1 wherein said means for introducing a doppler frequency shift into the system comprises:
   a. a first continuous wave source connected in circuit with said first balanced mixer comprising:
      1. a crystal oscillator,
      2. a frequency multiplier coupled to said crystal oscillator, and
      3. a crystal frequency trimmer connected to said crystal oscillator,
   b. a second continuous wave source connected in circuit with said second balanced mixer comprising:
      1. a crystal oscillator,
      2. a frequency multiplier coupled to said crystal oscillator, and
      3. a crystal frequency trimmer connected to said crystal oscillator.

3. A double mixing doppler simulator as claimed in claim 1 wherein said means for introducing a doppler frequency shift into the system comprises:
   a. an offset frequency synthesizer coupled between said first and said second balanced mixers, and
   b. a burst generator connected to said offset frequency synthesizer.

4. A double mixing doppler simulator as claimed in claim 3 wherein said offset frequency synthesizer comprises:
   a. a first crystal oscillator,
   b. a second crystal oscillator,
   c. an audio oscillator coupled to said second crystal oscillator via a first mixer, the output of said first mixer fed to a second mixer,
   d. a first frequency multipler, said first crystal oscillator connected to said first frequency multiplier and to said second mixer,
   e. a second frequency multiplier, the output of said second mixer fed to said second frequency multiplier, and
   f. a diode mixer coupled between the outputs of said first and said second frequency multiplier which are connected to said first and second balanced mixers, respectively.

* * * * *